Figure 1:
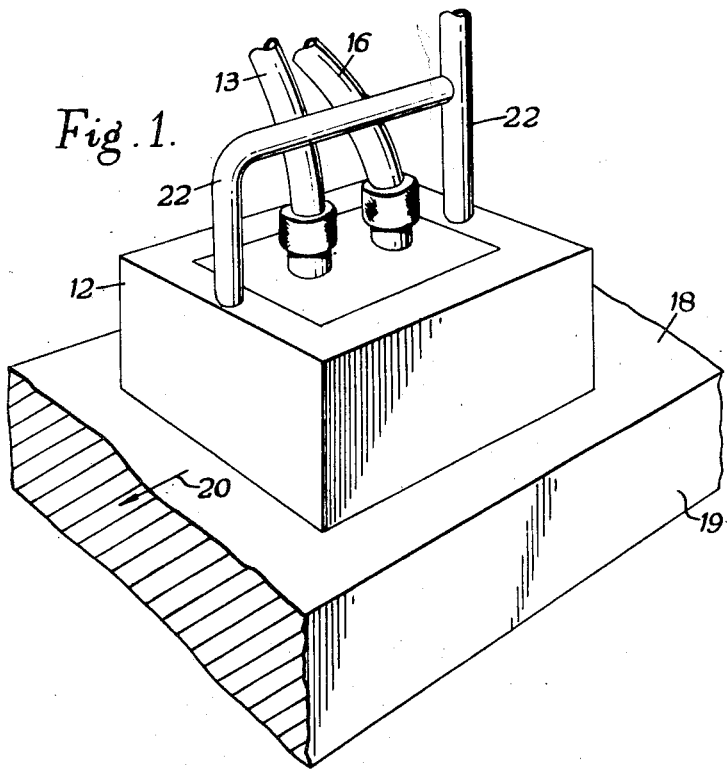

Jan. 27, 1959    A. B. C. RANKIN    2,871,381

ULTRASONIC TESTING OF MATERIALS

Filed Feb. 16, 1956

A. B. C. RANKIN
INVENTOR

BY Moore & Hall

ATTORNEYS

United States Patent Office 2,871,381
Patented Jan. 27, 1959

2,871,381

ULTRASONIC TESTING OF MATERIALS

Alexander Bryce Calder Rankin, Barkingside, England, assignor to Kelvin & Hughes Limited, Glasgow, Scotland Application February 16, 1956, Serial No. 566,010

Claims priority, application Great Britain February 21, 1955

4 Claims. (Cl. 310—8.2)

This invention relates to the ultrasonic testing of materials and has particular reference to production testing methods. The testing of materials during production may be effected by passing the materials through a fixed testing site and such continuous testing may require scanning speeds considerably greater than those required for individual inspection of solid objects. There is, however, a limit to the scanning speeds which can be achieved with contact scanning that is using probes in contact with the material under test. Thus an increase in speed increases the damage and wear of the probes and the resulting falling off in performance of the probes may result in distortion of the ultrasonic inspecting beam. Further, with the usual liquid film coupling between the probes and the material under test, the ultrasonic component of frictional noise as the scanning speed is increased affects the observation of the trace display. This is particularly noticeable at lower ultrasonic test frequencies. All these difficulties increase as the surface condition of the work becomes rougher and in many instances the sliding of probes at any reasonable speed over surfaces with which they are in direct contact is not practicable.

One method of overcoming these difficulties has been proposed using immersion scanning in which the material under test is totally immersed in a liquid bath. This method presents some handling difficulties especially with large specimens, and clearly has a limited application, particularly in production testing such as has been referred to. In addition coupling losses are high at the liquid/solid interfaces, because of the large differences in specific acoustic impedance.

It is an object of this invention to provide an improved method and means adapted for the ultrasonic testing of materials using fast mechanical and automatic scanning and which, while free from the difficulties of contact scanning, is more convenient and efficient than immersion scanning.

It is a further object of the invention to provide a method of ultrasonic testing which is free from the aeration effects encountered in immersion testing.

In accordance with the present invention, there is provided a probe structure for ultrasonic testing comprising an ultrasonic vibration-transmitting probe having a surface adapted to transmit vibrations to, and/or receive vibrations from, a surface of material to be tested, and spacing means adapted to be moved relatively to and in contact with the said surface of the material and to maintain a fixed spacing between the probe surface and the said surface of the material.

Means may be provided for passing liquid such as water, through the space between the probe and the material under test.

The invention also provides a method of testing material using ultrasonic vibrations comprising producing relative movement between a vibration-transmitting probe and a surface of the material while maintaining a fixed spacing between the probe and the said surface, and passing a liquid through the space between the probe and the said surface.

Figure 2:
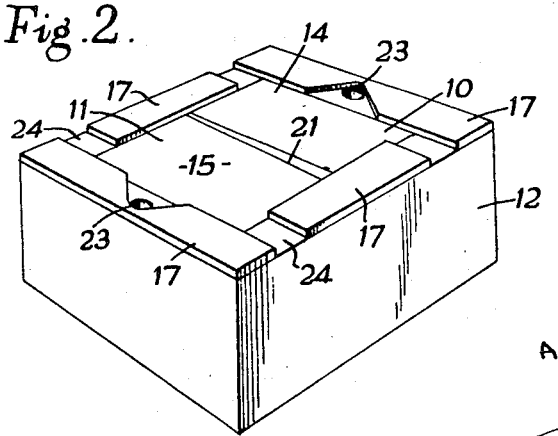

Other features of the invention will be apparent from the following description with reference to the accompanying drawing in which:

Fig. 1 is a perspective view of a probe structure according to the invention in position on material to be tested, and Fig. 2 is a perspective underside view of the probe structure in Fig. 1.

Referring to the drawing, a transmitting and a receiving probe, 10 and 11 respectively, are supported in a liquid-tight casing 12 of metal or moulded plastic. Electrical oscillations of ultrasonic frequency are fed to the transmitting probe through a cable 13 and set a surface 14 of the probe in vibration while oscillations picked up at a surface 15 of the receiving probe generate electrical oscillations which are fed out through a cable 16. The casing 12 has bearing surfaces 17 parallel to but standing proud with respect to the probe surfaces 14 and 15 and extending on four sides of the probe surfaces. When the probe assembly is arranged upon a surface 18 of material 19 to be tested, the bearing surfaces 17 rest on the surface 18 and the probe surfaces 14, 15 are thus held at a fixed distance from the surface 18. Relative movement between the probe structure and the material 19 may be produced in the direction 20 for scanning purposes.

An acoustic curtain 21 of rubber may be provided between the probes in order to reduce direct transmission of waves from one probe to the other.

In use, a suitable liquid, for example water, is fed to the probe structure through pipes 22, emerges through orifices 23, spreads over the space between the surfaces 14 and 15 on the one hand and the surface 18 on the other hand, and escapes through outlet passages constituted by spaces 24 between the bearing surfaces 17. The liquid acts as an acoustic coupling medium.

The distance between the surfaces 14, 15 on the one hand and the surface 18 on the other hand, measured in the direction of propagation of the vibrations is preferably made about equal to one half-wavelength of longitudinal waves in the liquid at the frequency employed, or to an integral number of half-wavelengths. The spacing is, however, not very critical, and satisfactory results have been obtained using spacings varying between a few thousandths of an inch to three wavelengths at a frequency of 2.5 mc./s.

The probes 10 and 11 are, of course, so shaped and associated with their transducers, such as piezo-electric crystals, as to inject the vibrations into the material under test at the required angle and to receive vibrations from the material at the appropriate angle.

It will be seen from the above description of the invention that although it has particular advantages in connection with ultrasonic testing using high scanning speeds, it could also be used to advantage in ultrasonic inspection employing normal scanning speeds.

The invention is, of course, applicable to a transmitting or a receiving probe mounted by itself, or to a single probe constituting both a transmitting and a receiving probe.

I claim:

1. A probe structure for ultrasonic testing comprising a first transducer having a wave transmitting surface through which ultrasonic waves are emitted into a surface of a body under test, a second transducer having a wave receiving surface, disposed alongside of and co-planar with said wave transmitting surface, through which ultrasonic waves are received from said body surface, spacing means at least partly surrounding said transmitting and receiving surfaces, fixed in relation to said transmitting and receiving surfaces, having a bearing surface for engaging said body surface and defining the depth of a space between said transmitting and receiving surfaces and said body surface, said depth being a small fraction of the linear dimensions of either of said transmitting and receiving surfaces, and means for passing liquid through said space.

2. A probe structure for ultrasonic testing comprising a first transducer having a wave transmitting surface through which ultrasonic waves are emitted into a surface of a body under test, a second transducer having a wave receiving surface, disposed alongside of and co-planar with said wave transmitting surface, through which ultrasonic waves are received from said body surface, spacing means at least partly surrounding said transmitting and receiving surfaces, fixed in relation to said transmitting and receiving surfaces, having a bearing surface for engaging said body surface and defining the depth of a space between said transmitting and receiving surfaces and said body surface, means for applying electrical oscillations to said first transducer to generate said ultrasonic waves, and means for passing liquid through said space, the depth of said space being approximately equal to $n\lambda/2$, where is the wavelength of the longitudinal ultrasonic waves in said liquid and $n$ is a small odd integer, including unity.

3. The combination set forth in claim 1, said bearing surface being positioned parallel to but standing proud with respect to said wave transmitting and wave receiving surfaces and extending on four sides of the probe surfaces.

4. The combination set forth in claim 2, said bearing surface being positioned parallel to but standing proud with respect to said wave transmitting and wave receiving surfaces and extending on four sides of the probe surfaces.

References Cited in the file of this patent

UNITED STATES PATENTS

| 2,592,134 | Firestone | Apr. 8, 1952 |

FOREIGN PATENTS

| 352,040 | France | June 29, 1931 |
| 893,459 | France | July 28, 1944 |
| 894,737 | France | Mar. 20, 1944 |

OTHER REFERENCES

The Iron Age, June 8, 1944, pages 60–61.